(12) United States Patent
Eavenson, Sr. et al.

(10) Patent No.: US 7,631,477 B2
(45) Date of Patent: Dec. 15, 2009

(54) ADJUSTABLE STRIPING ROLLER FOR LAWN MOWER

(75) Inventors: Jimmy Eavenson, Sr., Aurora, OH (US); Brian Bagwell, Canfield, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 12/290,569

(22) Filed: Oct. 31, 2008

(65) Prior Publication Data

US 2009/0113864 A1 May 7, 2009

Related U.S. Application Data

(60) Provisional application No. 61/001,421, filed on Nov. 1, 2007.

(51) Int. Cl.
*A01D 34/00* (2006.01)
*A01D 82/00* (2006.01)
(52) U.S. Cl. .............................. 56/17.4; 56/1; 56/320.1
(58) Field of Classification Search .................. 56/16.7, 56/17.4, 320.1, 1; 16/33, 35 D, 44, 19
See application file for complete search history.

(56) References Cited

U.S. PATENT DOCUMENTS

| | | | | |
|---|---|---|---|---|
| 1,686,894 A | * | 10/1928 | Buckert et al. .................. | 16/33 |
| 1,873,347 A | * | 8/1932 | Smart .............................. | 16/33 |
| 1,929,337 A | * | 10/1933 | Sullivan ....................... | 56/16.7 |
| 1,958,905 A | * | 5/1934 | Anderson ............. | 280/124.128 |
| 2,032,784 A | | 3/1936 | Worthington | |
| 2,271,304 A | * | 1/1942 | Mulholland ..................... | 16/44 |
| 2,507,980 A | * | 5/1950 | Knapp ................... | 280/124.128 |
| 2,532,174 A | * | 11/1950 | Lieberman .................... | 56/255 |
| 2,660,018 A | * | 11/1953 | Clemson ....................... | 56/249 |

(Continued)

FOREIGN PATENT DOCUMENTS

GB 2422764 9/2006

*Primary Examiner*—Thomas B Will
*Assistant Examiner*—Joan D Misa
(74) *Attorney, Agent, or Firm*—Wegman, Hessler & Vanderburg

(57) ABSTRACT

A lawn mower has a striping roller assembly rotatably attaching a striping roller to a mower deck of the lawnmower. The striping roller assembly includes a mounting bracket connected to the mower deck, the bracket having a top arm that extends from the mower deck in a generally horizontal direction. A roller arm is pivotally mounted on the bracket at a pivot connection. A height adjusting rod attaches to the pivoting roller arm to permit the operator to select different height settings for the striping roller assembly, wherein the height adjusting rod passes through an opening in the top arm of the bracket and is slidable relative to the bracket. A U-shaped connection member having upper and lower legs is positioned such that the upper leg is above and the lower leg is below the top arm of the bracket. A spring biases the U-shaped connection member so that the upper leg is forced toward or against the upper surface of the top arm of the bracket. The assembly further includes a collar on the upper leg, wherein an upper end of the height adjusting rod has a plurality of height-adjustment holes passing through the rod and the collar also has a hole, wherein one of the holes in the rod is aligned with the hole in the collar and a pin is inserted through the holes to fix the collar to the height adjusting rod.

14 Claims, 3 Drawing Sheets

U.S. PATENT DOCUMENTS

| | | | |
|---|---|---|---|
| 2,667,026 A * | 1/1954 | Ingram | 56/249 |
| 2,674,837 A | 4/1954 | Buck | |
| 2,896,390 A | 7/1959 | Cunningham | |
| 2,908,127 A * | 10/1959 | Milton | 56/13.7 |
| 2,973,613 A * | 3/1961 | Hagedorn | 56/10.5 |
| 3,096,606 A | 7/1963 | Weir | |
| 3,190,061 A * | 6/1965 | Gilbertson | 56/10.5 |
| 3,555,793 A * | 1/1971 | Chapman | 56/17.4 |
| 3,977,163 A | 8/1976 | Olin et al. | |
| 4,144,698 A * | 3/1979 | Shelton | 56/1 |
| 4,638,622 A * | 1/1987 | Smith | 56/17.4 |
| 4,899,828 A | 2/1990 | Harris | |
| 4,903,465 A * | 2/1990 | Hughes | 56/12.7 |
| 5,085,044 A * | 2/1992 | Freier et al. | 56/13.5 |
| 5,165,485 A * | 11/1992 | Fujikawa et al. | 172/15 |
| 5,355,664 A * | 10/1994 | Zenner | 56/15.8 |
| 5,553,380 A * | 9/1996 | Rice | 29/895.2 |
| 5,586,604 A | 12/1996 | Postema | |
| D395,900 S * | 7/1998 | Shannon et al. | D15/28 |
| 5,870,888 A | 2/1999 | Pugh | |
| 6,200,066 B1 | 3/2001 | Humphrey | |
| 6,202,396 B1 | 3/2001 | Thomas | |
| 6,447,889 B2 | 9/2002 | Kulkaski | |
| 6,523,335 B2 | 2/2003 | Vanderipe | |
| D485,850 S * | 1/2004 | Anderson | D15/17 |
| D498,484 S * | 11/2004 | Anderson | D15/17 |
| 6,832,468 B2 | 12/2004 | Weinlader | |
| 6,962,039 B2 * | 11/2005 | Greenhoe | 56/16.7 |
| 7,024,845 B2 | 4/2006 | Kallevig et al. | |
| 7,237,374 B2 | 7/2007 | Sugden et al. | |
| 7,373,768 B2 * | 5/2008 | Sugden et al. | 56/249 |
| D584,747 S * | 1/2009 | Sprinkmann et al. | D15/17 |
| 7,497,449 B2 * | 3/2009 | Logger | 280/47.38 |
| 2003/0159418 A1 * | 8/2003 | Lin | 56/14.7 |
| 2006/0144029 A1 | 7/2006 | Kallevig et al. | |
| 2006/0191252 A1 | 8/2006 | Slater et al. | |

* cited by examiner

ADJUSTABLE STRIPING ROLLER FOR LAWN MOWER

CROSS REFERENCE TO RELATED APPLICATIONS

This application claims the priority benefit of U.S. Provisional Patent Application Ser. No. 61/001,421 filed Nov. 1, 2007.

BACKGROUND OF THE INVENTION

1. Field of Invention

This invention relates to a striping roller assembly to be attached to a lawn mower for striping a grass lawn and, more particularly, an adjustable and spring loaded striping roller assembly mounted on the lawn mower deck.

2. Description of Related Art

Lawn striping assemblies are generally known in the art of grooming lawns. In particular, striping assemblies are typically used in areas such as golf courses and baseball stadiums to create an aesthetic striped appearance on the grass. Striping assemblies are typically mounted to or towed behind lawnmowers and create a desired striped appearance in the freshly cut grass by bending the grass from a generally vertical orientation to a more horizontal orientation in the direction of travel of the striping assembly. Striping assemblies typically use striping rollers, brushes, or wipers as the striping element that bends the grass.

However, known striping assemblies have several drawbacks. For instance, some striping assemblies are fixed with respect to the cutting deck of the mower. Consequently, the striping assembly is unable to adjust independently from the cutting deck and would only produce a desirable striping effect when the cutting deck is set at a height that allows the fixed striping assembly to deform the grass an appropriate amount. In addition, some striping assemblies require significant effort and additional tools to attach/detach from the lawnmowers.

Other striping assemblies do make the height setting of the striping element adjustable. However, if the height of the striping mechanism is in a fixed position relative to the cutting deck, and if the deck cut height changes without the striping mechanism being repositioned, the pitch (front-to-rear orientation) of the deck could be negatively affected (if cutting lower) or the striping effect could be diminished (if cutting higher). The condition where the deck pitch is altered could also be produced if the grass type or consistency changes, such that stiffer and lusher grasses would be deformed less while softer and thinner grasses would be deformed more.

In light of the foregoing, a striping assembly that improves the state of the art by overcoming one or more of the aforesaid problems of the prior art is desired.

SUMMARY OF THE INVENTION

The invention is directed to a lawn mower having an adjustable striping roller assembly mounted on its mower deck. The adjustable striping roller assembly includes a mounting bracket connected to the mower deck, the bracket having a top arm extending away from the mower deck in a generally horizontal direction and a lower portion generally adjacent the mower deck. The top arm has an opening therein. The striping roller assembly also has a roller arm pivotally mounted on the lower portion of the mounting bracket at a pivot connection and a striping roller rotatably mounted on a distal end of the roller arm. A height adjusting rod is attached to the pivoting roller arm and has a plurality of height-adjustment holes in an upper end thereof. The height adjusting rod attaches to the roller arm intermediate the pivot connection and the distal end of the roller arm and extends through the opening in the top arm of the bracket and is slidable relative to the bracket. The striping roller assembly also has a U-shaped connection member having substantially parallel upper and lower legs with a collar formed on the upper leg. The collar has a height-selection hole therein. The U-shaped connection member is positioned with respect to the mounting bracket such that the upper leg and collar are above the top arm of the bracket and the lower leg is below the top arm of the bracket. A biasing member is positioned such that one end of the biasing member rests against the lower leg of the U-shaped connection member and the other end of the spring rests against the underside of the top arm of the bracket such that the biasing member acts upon the U-shaped connection member causing the upper leg to be biased toward the upper surface of the top arm of the bracket and forcing the striping roller downward with respect to the mower deck. After aligning one of the height-adjustment holes in the height adjusting rod with the height-selection hole in the collar to select the desired height of the striping roller, a connector pin is inserted through the holes to fix the collar to the height adjusting rod, thereby positioning the striping roller at the desired height. Upward movement of the striping roller causes the roller arm to pivot about the pivot connection, thereby causing the height adjusting rod to slide upward through the opening in the top arm of the mounting bracket against the biasing force of the biasing member.

These and other features and advantages of the present invention are illustrated in the accompanying drawings, and are more fully disclosed in the following detailed description.

BRIEF DESCRIPTION OF THE DRAWINGS

The structure, operation, and advantages of the presently disclosed embodiment of the invention will become apparent when consideration of the following description taken in conjunction with the accompanying drawings wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
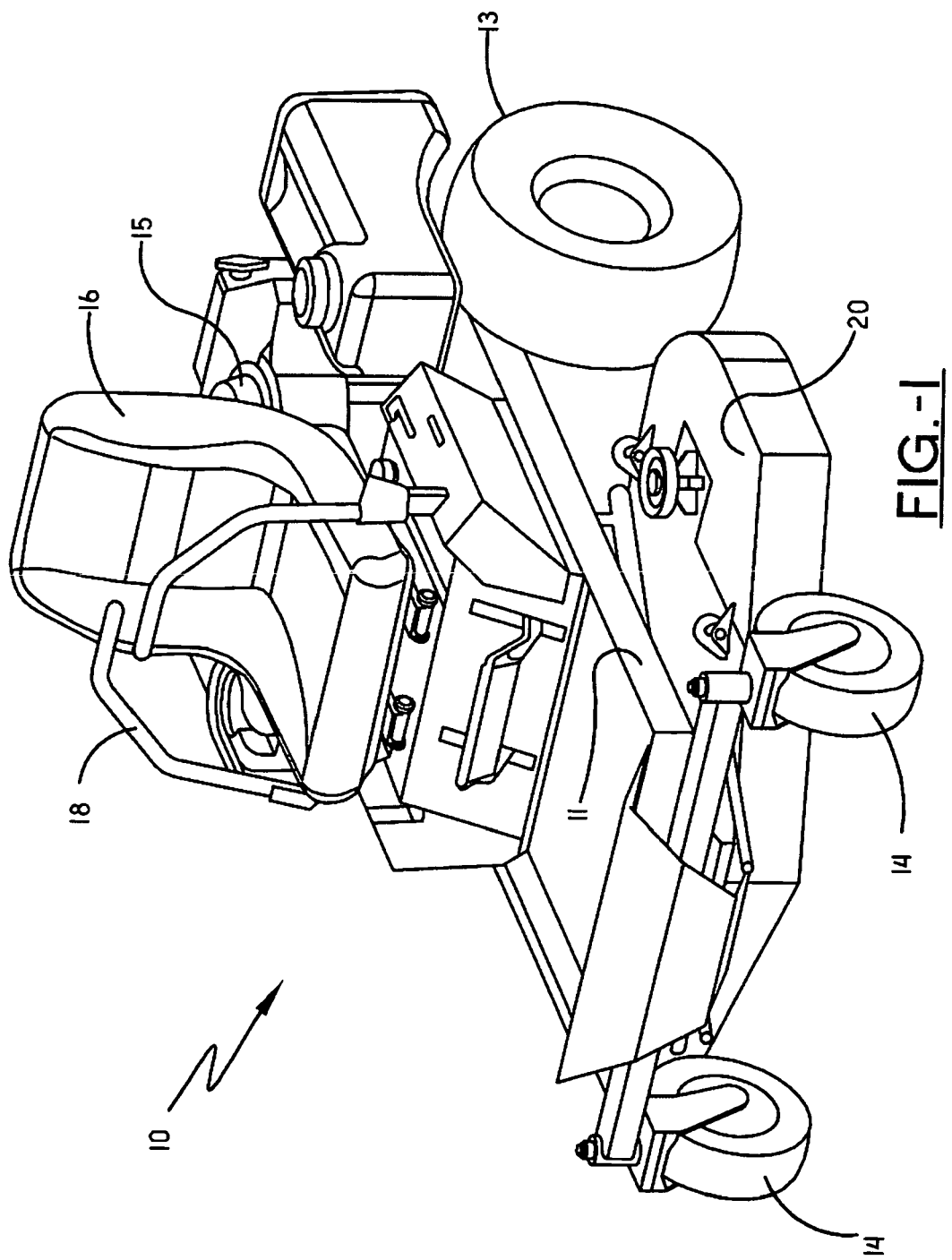
FIG. 1 is a perspective view of a lawn mower.

Referring now to the drawings, FIG. 1 shows a lawn mower 10 equipped with a chassis 11, first and second rear ground engaging wheels 13, and first and second front ground engaging wheels 14. The rear ground engaging wheels 13 may be first and second rear drive wheels for use in providing locomotion for the lawn mower 10. The lawn mower 10 may also include an engine 15, which may be of any type and configuration, for use in transferring power to drive the rear ground engaging wheels 13. An operator seat 16 and steering levers 18 are provided to allow the operator to selectively steer the lawn mower 10 as desired. It is noted that any manner of steering and driving the lawn mower 10 may be chosen with sound engineering judgment, including but not limited to Zero Radius Turning lawn mowers. A mower deck 20 is operatively connected to chassis 11 in a manner well known in the art. The engine 15 also is configured to provide power to drivingly engage at least one cutting blade (not shown) housed within the mower deck 20. The cutting blades are used to sever or cut vegetation as is well known in the art. Although a Zero Radius Turning lawn mower 10 is illustrated in conjunction with an embodiment of the invention disclosed herein, one skilled in the art will understand that the invention may be used with other types of lawn mowers, including walk-behind mowers.

Figure 2:
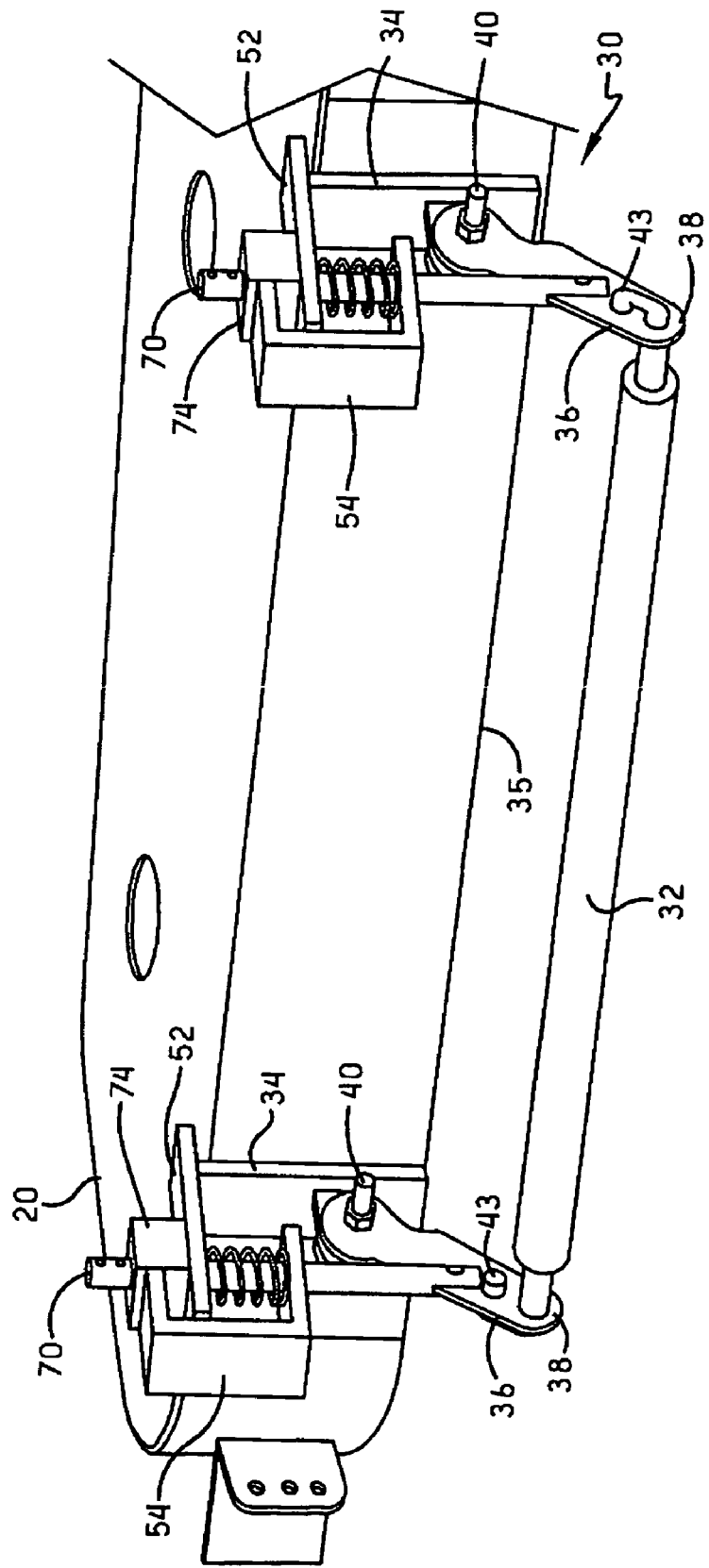
FIG. 2 is a close-up view of the rear portion of the mower deck of the lawn mower of FIG. 1 having a striping roller assembly according to an embodiment of the invention.

Referring to FIG. 2, a striping roller assembly 30 constructed in accordance with one embodiment of the invention is shown attached to rear portion of the mower deck 20 of the lawn mower 10 of FIG. 1. In general, the striping roller assembly 30 includes at least one striping roller 32 configured to create a striped appearance in the grass surface. Left and right brackets 34 of the striping roller assembly 30 mount the striping roller 32 to the mower deck 20 of the lawn mower 10. Desirably, the left and right sides of the striping roller assembly 30 are substantially similar but mirror images of each other. Therefore, only one side of the striping assembly 30 need be described in detail herein, as one skilled in the art will understand the construction of the opposing side. The brackets 34 may be bolted, riveted, welded or attached through other suitable means to a rear skirt 35 of the mower deck 20. As illustrated, a pivoting roller arm 36 is connected to the mounting bracket 34, the distal end 38 of which receives an end of the striping roller 32. The roller arm 36 is connected to the mounting bracket 34 with a suitable pivoting connection 40, such as a spherical ball joint. In the illustrated embodiment, the bracket 34 has a generally vertically extending side portion 41 on which the pivoting connection 40 is made. However, one skilled in the art will understand that other pivoting connections 40 may be used to mount the roller arm 36 to the mounting bracket 34 using sound engineering judgment. Desirably, the pivoting connection 40 on the mounting bracket 34 is free to pivot independent of the pivoting connection 40 on the mounting bracket 34 on the opposing side of the striping assembly 30 so that each end of the striping roller 32 pivots independently of the other so as to provide terrain following and jounce absorption.

In one embodiment, a shaft 42 on which the striping roller 32 is rotatably received is mounted on the pivoting roller arms 36. The shaft 42 is desirably a steel rod that generally extends the width of the cutting deck 20 of the lawn mower 10. In one embodiment, the shaft 42 has hooked ends 43 that pass through holes in the roller arm 36. However, one skilled in the art will understand that any known means may be used to rotatably mount the striping roller 32 to the pivoting roller arms 36 without departing from the scope of the invention. For example, the shaft may be received in end bearings in the distal end 38 of the pivoting roller arm 36. Alternately, the pivoting roller arm 36 may include an opening configured to receive the shaft 42 supporting the striping roller 32. The opening receives a stepped collar mounted to one side of the pivoting roller arm and configured to support the shaft. The collar may include a tap hole through which a set screw is passed and configured to secure the shaft to the collar. Alternately, shaft 42 may be secured to the roller arms 36 with the striping roller 32 being free to rotate on the shaft.

Figure 3:
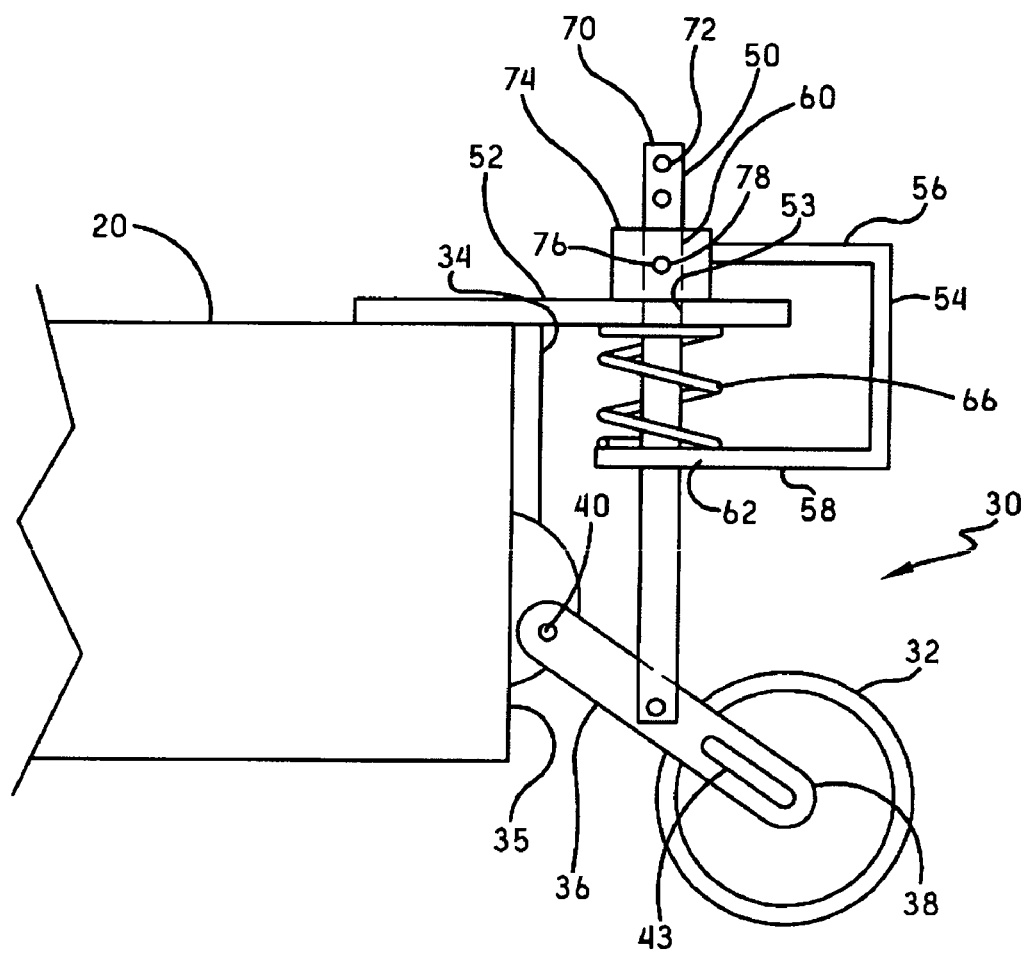
FIG. 3 is a side view of the striping roller assembly of FIG. 2.

As best seen in the side view of FIG. 3, according to the invention a height adjusting rod 50 is attached to the pivoting roller arm 36 to permit the operator to select different height settings for the striping roller assembly 30. The height adjusting rod 50 is desirably connected to the pivoting roller arm 36 intermediate the pivot connection 40 and the distal end 38 of the roller arm 36 to which the striping roller 32 is mounted. A top arm 52 of the bracket 34 extends away from the mower deck 20 in a generally horizontal direction. The height adjusting rod 50 passes through an opening 53 in the top arm 52 of the bracket 34, but is not directly connected to the bracket 34 in a fixed manner but is rather free to slide in the opening 53. A generally U-shaped connection member 54 having upper and lower legs 56, 58 is positioned such that the upper leg 56 is above and the lower leg 58 is below the top arm 52 of the bracket. The upper and lower legs 56, 58 also have openings 60, 62 through which the height adjusting rod 50 is also received. In the illustrated embodiment, a coil spring 66, broadly a biasing member, is co-axially positioned on the height adjusting rod 50 such that one end of the spring 66 is against the lower leg 58 of the U-shaped connection member 54 and the other end of the spring 66 is against the underside of the top arm 52 of the bracket 34. The spring 66 biases the U-shaped connection member 54 so that the upper leg 56 is forced toward or against the upper surface of the top arm 52 of the bracket 34. Although a coil spring 66 is used in the illustrated embodiment, one skilled in the art will understand that other spring configurations may be used to bias the U-shaped connection member 54 in the downward direction with respect to the top arm 52 of the bracket 34.

An upper end 70 of the height adjusting rod 50 has a plurality of height-adjustment holes 72 passing through the rod 50. A collar 74 on the upper leg 56 also has a height-selection hole 76 that can be aligned with a selected one of the height adjusting holes 72 in the rod 50 as the rod 50 is moved with respect to the collar 74. It is to be understood that the collar 74 may be formed as part of the upper leg 56 of the U-shaped connection member 54, or may be a separate component with the upper leg 56 resting on top of the collar 74. The operator selects the desired height setting of the striping roller assembly 30 by aligning one of the holes 72 in the rod 50 with the hole 76 in the collar 74 and inserting a pin 78 or other suitable connector to fix the collar 74 to the height adjusting rod 50. In this configuration, the spring 66 biases the U-shaped connection member 54 and thus the height adjustment rod 50 downward until the collar 74 and pin 78 prevent further downward movement of the U-shaped connection member 54. This forces the striping roller 32 downwardly in relation to the mower deck 20 and it is held there with a prescribed pressure by the spring 66. If a bump or rise in the ground surface is encountered, the striping roller 32 pivots upward with the roller arm 36 about the pivot connection 40 against the biasing force of the spring 66. As the roller arm 36 moves upward, the height adjusting rod 50 slides through the opening 53 in the top arm 52 of the bracket 34. Since the collar 74 is fixed to the rod 50, the U-shaped connection member 54 also moves up with respect to the top arm 52 of the bracket 34 with the rod 50 and the spring 66 is compressed between the lower leg 58 of the U-shaped connection member 54 and the top arm 52 of the bracket 34.

It therefore can be seen that the striping roller assembly 30 can be mounted to the mower deck 20 and depresses the grass at a prescribed pressure set by the spring 66 without affecting the cutting height of the mower deck 20. The height adjusting rod 50 and spring 66 allow the operator to select the pressure exerted by the striping roller 32 to compensate for different grass types and conditions and also for different height settings of the mower deck 20. Additionally, as the striping roller assembly 30 is attached to a lawn mower deck 20, when the mower deck 20 is raised, such as to transport the mower 10 or to pass over rough terrain, the striping roller assembly 30 is also raised with the mower deck 20 and therefore can be protected from damage.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A lawn mower comprising:
   a mower deck;
   an adjustable striping roller assembly mounted on the mower deck, the striping roller assembly comprising:
      a mounting bracket connected to the mower deck, the bracket having a top arm extending away from the mower deck in a generally horizontal direction and a lower portion generally adjacent the mower deck, wherein said top arm has an opening therein;
      a roller arm pivotally mounted on the lower portion of the mounting bracket at a pivot connection;
      a striping roller rotatably mounted on a distal end of said roller arm;
      a height adjusting rod attached to the pivoting roller arm and having a plurality of height-adjustment holes in an upper end thereof, the height adjusting rod attaching to the roller arm intermediate the pivot connection and the distal end of the roller arm, wherein the height adjusting rod extends through the opening in the top arm of the bracket and is slidable relative to the bracket;
      a U-shaped connection member having substantially parallel upper and lower legs with a collar on the upper leg, the collar having a height-selection hole therein, the U-shaped connection member being positioned with respect to the mounting bracket such that the upper leg and collar are above the top arm of the bracket and the lower leg is below the top arm of the bracket;
      a biasing member positioned such that one end of the biasing member rests against the lower leg of the U-shaped connection member and the other end of the biasing member rests against the underside of the top arm of the bracket such that said biasing member acts upon the U-shaped connection member causing the upper leg to be biased toward the upper surface of the top arm of the bracket and forcing the striping roller downward with respect to the mower deck; and
      a connector pin, wherein after aligning one of the height-adjustment holes in the height adjusting rod with the height-selection hole in the collar to select the desired height of the striping roller, the connector pin is inserted through said holes to fix the collar to the height adjusting rod, thereby positioning the striping roller at the desired height.

2. The lawnmower of claim 1 wherein upward movement of the striping roller pivots the roller arm about the pivot connection, thereby causing the height adjusting rod and U-shaped connection member to slide relative the top arm of the mounting bracket against the biasing force of the biasing member.

3. The lawnmower of claim 1 wherein the upper and lower legs have openings through which the height adjusting rod is received.

4. The lawnmower of claim 1 wherein the biasing member is a coil spring co-axially positioned on the height adjusting rod.

5. The lawnmower of claim 4 wherein the spring biases the U-shaped connection member and thus the height adjustment rod moves downward until the collar and pin prevent further downward movement of the U-shaped connection member, thereby forcing the striping roller downward in relationship to the mower deck with a pressure from the spring.

6. The lawnmower of claim 1 wherein the collar is formed as part of the upper leg of the U-shaped connection member.

7. The lawnmower of claim 1 wherein the collar is a separate component from the upper leg with the upper leg resting on top of or below the collar.

8. An adjustable striping roller assembly to be mounted on the mower deck or a lawn mower, the striping roller assembly comprising:
   a mounting bracket connectable to a mower deck of a lawn mower, the bracket having a top arm extending away from the mower deck in a generally horizontal direction and a lower portion generally adjacent the mower deck, wherein said top arm has an opening therein;
   a roller arm pivotally mounted on the lower portion of the mounting bracket at a pivot connection;
   a striping roller rotatably mounted on a distal end of said roller arm;
   a height adjusting rod attached to the pivoting roller arm and having a plurality of height-adjustment holes in an upper end thereof, the height adjusting rod attaching to the roller arm intermediate the pivot connection and the distal end of the roller arm, wherein the height adjusting rod extends through the opening in the top arm of the bracket and is slidable relative to the bracket;
   a U-shaped connection member having substantially parallel upper and lower legs with a collar on the upper leg, the collar having a height-selection hole therein, the U-shaped connection member being positioned with respect to the mounting bracket such that the upper leg and collar are above the top arm of the bracket and the lower leg is below the top arm of the bracket;
   a biasing member positioned such that one end of the biasing member rests against the lower leg of the U-shaped connection member and the other end of the biasing member rests against the underside of the top arm of the bracket such that said biasing member acts upon the U-shaped connection member causing the upper leg to be biased toward the upper surface of the top arm of the bracket and forcing the striping roller downward with respect to the mower deck; and
   a connector pin, wherein after aligning one of the height-adjustment holes in the height adjusting rod with the height-selection hole in the collar to select the desired height of the striping roller, the connector pin is inserted through said holes to fix the collar to the height adjusting rod, thereby positioning the striping roller at the desired height.

9. The adjustable striping roller assembly of claim 8 wherein upward movement of the striping roller pivots the roller arm about the pivot connection, thereby causing the height adjusting rod and U-shaped connection member to slide relative the top arm of the mounting bracket against the biasing force of the biasing member.

10. The adjustable striping roller assembly of claim 8 wherein the upper and lower legs have openings through which the height adjusting rod is received.

11. The adjustable striping roller assembly of claim 8 wherein the biasing member is a coil spring co-axially positioned on the height adjusting rod.

12. The adjustable striping roller assembly of claim 11 wherein the spring biases the U-shaped connection member and thus the height adjustment rod moves downward until the collar and pin prevent further downward movement of the U-shaped connection member, thereby forcing the striping roller downward in relationship to the mower deck with a pressure from the spring.

13. The adjustable striping roller assembly of claim 8 wherein the collar is formed as part of the upper leg of the U-shaped connection member.

14. The adjustable striping roller assembly of claim 8 wherein the collar is a separate component from the upper leg with the upper leg resting on top of or below the collar.

* * * * *